(12) United States Patent
Subramaniam et al.

(10) Patent No.: US 7,904,399 B2
(45) Date of Patent: Mar. 8, 2011

(54) METHOD AND APPARATUS FOR DETERMINING DECISION POINTS FOR STREAMING CONVERSATIONAL DATA

(75) Inventors: L. Venkata Subramaniam, Gurgaon (IN); Ganesh Ramakrishnan, Mumbai (IN); Tanveer A Faruquie, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 11/940,551

(22) Filed: Nov. 15, 2007

(65) Prior Publication Data
US 2009/0132442 A1 May 21, 2009

(51) Int. Cl.
*G06E 1/00* (2006.01)
(52) U.S. Cl. .......................................................... 706/20
(58) Field of Classification Search .................... 706/12, 706/20, 62; 704/231, 236, 240, 245, 246, 704/250–255
See application file for complete search history.

(56) References Cited

U.S. PATENT DOCUMENTS

| | | | |
|---|---|---|---|
| 5,710,866 A * | 1/1998 | Alleva et al. | 704/256.4 |
| 6,415,248 B1 * | 7/2002 | Bangalore et al. | 704/1 |
| 2005/0021357 A1 | 1/2005 | Schuetze et al. | |
| 2005/0105712 A1 | 5/2005 | Williams et al. | |
| 2006/0095521 A1 | 5/2006 | Patinkin | |
| 2006/0195321 A1 | 8/2006 | Deligne et al. | |
| 2008/0069437 A1 * | 3/2008 | Baker | 382/159 |
| 2009/0063150 A1 * | 3/2009 | Nasukawa et al. | 704/253 |
| 2009/0112588 A1 * | 4/2009 | Kummamuru et al. | 704/245 |

OTHER PUBLICATIONS

Anderson et al., A Thematic Analysis of LAte Recovery From Stuttering, 2003, American Journal of Speech-Language Pathology, pp. 1-11.*
Sebastiani, Machine Learning in Automated Text Categorization, 2002, ACM Computing Surveys, vol. 34, pp. 1-47.*
Tur, Gokhan; Hakkani-Tur, Dilek; Schapire, Robert E., Combining Active and Semi-Supervised Learning for Spokane Language Understanding, Speech Communication vol. 45-2, 2005.
So, Ying, A Tutorial on Logistic Regression, SAS Institute Inc., Cary NC, from from SUGI Proceedings, 1995.
Aggarwal, C; Han, J; Wang, J, Yu, P.S. On Demand Classification of Data Streams, Proceedings of Conference on Knowledge Discovery and Data Mining, Aug. 2004, Seattle.
Cohen, L; Avrahmi, G; Last, M; et al., Incremental Classification of Nonstationary Data Streams, ECML/PKDD Workshop on Knowledge Discovery from Data Streams, 2005, Portugal.
Domingos, P; Hulten, G, Mining High-Speed Data Streams, Proceedings of International Conference on Knowledge Discovery and Data Mining, 2000, Boston.
Glass, J; Hazen, T; Hetherington, I, Real-Time Telephone-Based Speech Recognition in the Jupiter Domain, IEEE Conference on Acoustics, Speech &Slgnal Processing 1999, Phoenix.
Hulten, G; Spencer, L; Domingos, P, Mining Time-Changing Data Streams, Conference on Knowledge Discovery and Data Mining, 2001, San Francisco.

(Continued)

*Primary Examiner* — David R Vincent
(74) *Attorney, Agent, or Firm* — Gibb I.P. Law Firm, LLC; Derek S. Jennings (57) ABSTRACT

A method for determining a decision point in real-time for a data stream from a conversation includes receiving streaming conversational data; and determining when to classify the streaming conversational data, using a measure of certainty, by performing certainty calculations at a plurality of time instances during the conversation and by selecting a decision point in response to the certainty calculations, the decision point not being based on a fixed window of conversational data but being based on accumulated conversational data available at different ones of the plurality of time instances. Systems and computer program products are also provided.

18 Claims, 5 Drawing Sheets

OTHER PUBLICATIONS

Katakis, I; Tsoumakas, G; Vlahavas, I, Dynamic Feature Space and Incremental Feature Selection . . . , ECML/PKDD Workshop on Knowledge Discovery from Data Streams, 2006, Berlin.

Klinkenberg, R et al., Detecting Concept Drift with Support Vector Machines, Conference on Machine Learning, 2000, San Francisco.

Kuo, H; Lee, C, Discriminative Training of Natural Language Call Routers, IEEE Trans. on Speech and Audio Processing, 11(1), 2003, pp. 24-35.

Landwehr, N; Hall, M; Eibe, F, Logistic Model Trees, European Conference an Machine Learning, Sep. 22-26, 2003, Cavtat-Dubrovnik, Croatia.

Tang, M; Pellom, B; Hacioglu, K; Calltype Classification and Unsupervised Training for the Call Center Domain, Automated Speech Recog and Understanding Workshop, 2003, USVI.

Widmer, G; Kubat, M, Learning in the Presence of Concept Drift and Hidden Contexts, Machine Learning 23(1), 1996, pp. 69-101.

\* cited by examiner

| TASK | BASELINE ACCURACY | GLOBAL ACCURACY | LOCAL ACCURACY | BEST ACCURACY | AV. GLOBAL TEST RATIO | AV. LOCAL TEST RATIO | BEST TEST RATIO |
|---|---|---|---|---|---|---|---|
| INTENT CLASSIFICATION | 77.41 | 80.64 | 80.64 | 83.87 | 0.47 | 0.41 | 0.40 |
| REASON CLASSIFICATION | 52.50 | 55.00 | 55.00 | 67.50 | 0.60 | 0.53 | 0.68 |

FIG. 4

| CALL FRACTION | BASELINE ACCURACY | GLOBAL ACCURACY | LOCAL ACCURACY | BEST ACCURACY |
|---|---|---|---|---|
| 0.2 | 70.96 | 80.64 | 80.64 | 93.54 |
| 0.4 | 70.96 | 87.09 | 87.09 | 96.77 |
| 0.6 | 74.19 | 80.64 | 77.42 | 93.55 |
| 0.8 | 70.97 | 80.64 | 77.42 | 93.54 |
| 1.0 | 77.41 | 80.64 | 80.64 | 83.87 |

FIG. 5

| CALL FRACTION | BASELINE ACCURACY | GLOBAL ACCURACY | LOCAL ACCURACY | BEST ACCURACY |
|---|---|---|---|---|
| 0.2 | 27.50 | 42.5 | 42.5 | 67.5 |
| 0.4 | 40.00 | 55.00 | 50.00 | 70.00 |
| 0.6 | 52.50 | 55.00 | 55.00 | 77.50 |
| 0.8 | 45.00 | 50.00 | 50.00 | 67.50 |
| 1.0 | 52.50 | 55.00 | 55.00 | 67.50 |

METHOD AND APPARATUS FOR DETERMINING DECISION POINTS FOR STREAMING CONVERSATIONAL DATA

TECHNICAL FIELD

The technical field comprises machine classification, such as text classification. The technical field also comprises training a machine classifier.

BACKGROUND

Automatic text categorization is the activity of automatically building automated text classifiers using machine learning techniques. These are systems capable of assigning a text document to one or more thematic categories (or labels) from a predefined set.

Text classification or categorization is a problem in information science in which an electronic document or some quantity of text is assigned to one or more categories, based on its contents. In supervised document classification, some external mechanism (such as human feedback) provides information on the correct classification for documents.

Text classification has become one of the primary methods of organizing online information. Another notable use of text classification techniques is spam filtering which tries to discern email spam messages from legitimate emails. Other applications are also possible, some of which will be described below.

A variety of techniques for supervised learning algorithms have demonstrated reasonable performance for text classification including naïve Bayes, k-nearest neighbor, support vector machines, boosting and rule learning algorithms, and use of maximum entropy.

Maximum entropy is a general technique for estimating probability distributions from data. The principle in maximum entropy is that when nothing is known, the distribution should be as uniform as possible, that is, have maximal entropy. Labeled training data is used to derive a set of constraints for the model that characterizes the class-specific expectations for the distribution. Constraints are represented as expected values of "features," any real-valued function of an example. A document is represented by a set of word count features. The labeled training data is used to estimate the expected value of these word counts on a class-by-class basis. Improved iterative scaling finds a text classifier of an exponential form that is consistent with the constraints from the labeled data. Entropy is described, for example, in Schneier, B: Applied Cryptography, Second edition, page 234, John Wiley and Sons.

Prior work has been performed on building classifiers for call classification based on transcriptions of the complete calls. (See Tang, M., Pellom, B., Hacioglu, K.: Calltype Classification and Unsupervised Training for the Call Center Domain, Proceedings of the Automatic Speech Recognition and Understanding Workshop, St. Thomas, US Virgin Islands, Nov. 30-Dec. 4 (2003), pp. 204-208, incorporated herein by reference). In call classification, the whole call (document) is collected before a decision is made.

Prior work has also been performed on routing customer calls based on the customer response to an open ended system prompt such as "Welcome to xxx, How may I help you?" (See Kuo, H.-K. J., Lee, C.-H.: Discriminative Training of Natural Language Call Routers, IEEE Trans. on Speech and Audio Processing 11 (1) (2003), pp. 24-35, incorporated herein by reference). In call routing, the whole customer utterance (sentence) is collected before the classifier makes a decision. Manually classified past utterances are used to train the classifier and the new calls are classified/routed based on this classifier.

In cases where the class distribution does not remain stationary, it has been proposed to use incremental learning to learn the non-stationarity of online data streams. (See Katakis, I., Tsoumakas, G., Vlahavas, I.: Dynamic Feature Space and Incremental Feature Selection for the Classification of Textual Data Streams, ECML/PKDD-2006, International Workshop on Knowledge Discovery from Data Streams, Berlin, Germany, (2006), pp. 107-116, incorporated herein by reference). The approach usually taken to capture non-stationarity is to take a fixed size or adaptive size time window or weigh the data depending on age or relevance. The size of the window tries to balance the adaptivity and generalization of the classifier.

In pure incremental learning, a dynamically adjustable window is maintained during the learning process, and whenever there is a concept drift, old instances are forgotten by altering the window size and the window size is again fixed when the concept seems to be stable (See Widmer, G., Kubat, M.: Learning in the Presence of Concept Drift and Hidden Contexts, Machine Learning 23(1) (1996), pp. 69-101, incorporated herein by reference).

The concept-adapting very fast decision tree learner (CVFDT) applies a very fast decision tree learner (VFDT) to build the model incrementally using a sliding window of fixed size. (See Hulten, G., Spencer, L., Domingos, P.: Mining Time-Changing Data Streams, Proceedings of International Conference on Knowledge Discovery and Data Mining (2001), pp. 97-106, incorporated herein by reference; and Domingos, P., Hulten., G.: Mining High-Speed Data Streams, Proceedings of International Conference on Knowledge Discovery and Data Mining, (2000), pp. 71-80, incorporated herein by reference).

For an evolving data stream with event bursts, techniques to dynamically decide the window horizon to incorporate the long term or short term relevance of the data stream have been proposed (See Aggarwal, C., Han, J. Wang, J., Yu, P. S.: On Demand Classification of Data Streams, Proceedings of the International Conference on Knowledge Discovery and Data Mining, Seattle, USA, August (2004), pp. 503-508, incorporated herein by reference).

Support Vector Machines (SVMs) have been used with a dynamic window size in which the window size is adjusted so that generalization error is minimized. (See Klinkenberg, R., Joachims, T.: Detecting Concept Drift with Support Vector Machines, Proceedings of International Conference on Machine Learning, (2000), pp. 487-494, incorporated herein by reference).

The Incremental On Line Information Network (IOLIN) dynamically adjusts the window size and training frequency based on statistical measures. (See Cohen, L., Avrahami, G., Last, M., Kandel, A., Kipersztok, O.: Incremental Classification of Nonstationary Data Streams, ECML/PKDD-2005 International Workshop on Knowledge Discovery from Data Streams, Portugal, (2005), incorporated herein by reference).

In the systems and methods, the classifier generally forgets its past and learns the new distribution based on the changed concepts. It is not clear when such a classifier should kick in by starting to collect features and when the classifier should take a final decision.

SUMMARY

Various aspects of the invention provide a system and method for classification of streaming text or streaming conversation data. Some aspects provide a system and method of classification of online streaming text in a conversation that is at least partially scripted.

Some aspects provide a method for determining a decision point in real-time for a data stream from a conversation, the method including receiving streaming conversational data; and determining when to classify the streaming conversational data, using a measure of certainty, by performing certainty calculations at a plurality of time instances during the conversation and by selecting a decision point in response to the certainty calculations, the decision point not being based on a fixed window of conversational data but being based on accumulated conversational data available at different ones of the plurality of time instances.

Some aspects provide a system for classification of streaming text, the system comprising a computer including a network adapter configured to receive connections from external computers, the computer being configured to receive streaming text and to determine when to classify the streaming conversational text, using a measure of certainty, by performing certainty calculations at a plurality of time instances during receipt of the streaming text and by selecting a decision point in response to the certainty calculations, the decision point being based on text accumulated at the respective time instances, and the computer being configured to perform a classification operation at the decision point.

Some embodiments provide a computer program product comprising a computer useable medium having a computer readable program, wherein the computer readable program when executed on a computer causes the computer to determine when to classify streaming conversational data, using a measure of certainty, by performing certainty calculations at a plurality of time instances during the conversation and by selecting a decision point in response to the certainty calculations, the decision point not being based on a fixed window of conversational data but being based on accumulated conversational data available at different ones of the plurality of time instances

DETAILED DESCRIPTION OF THE ILLUSTRATED EMBODIMENTS

Some embodiments provide a system and method for classifying streaming text, such as text from an automated speech recognizer (voice to text generator), text from a chat session, email conversation, SMS or other text messaging, or from other sources. The term "text" is not intended to be limited to the .txt format or any other specific format. There are numerous applications for text processing of streaming text output from an automated speech recognizer and for machine classifying streaming text. For example, some embodiments provide a system and method for classifying streaming text directed to a contact center.

Contact centers play a central role in building and maintaining the relationships of corporations with their customers. They serve to bridge the ever increasing gap between the complex product technologies or service processes with customer expectations. Services provided by the contact centers can include, for example, sales, service, marketing, problem-solving and customer support. The conversations between the agents and the customers are either oral over a phone line or through online chat, either of which are sources of streaming text.

The complexity and duration of these calls depend on the service requested by the customer. For example, service calls relating to changes in booking preferences have a well defined focus and are short in duration ranging from two to four minutes. On the other hand support calls for trouble shooting IT systems do not have a well defined intent and can range from twenty minutes to two hours. Contact center conversations are typically scripted. Usually the agent tries to follow a predefined call flow on which she has been trained. When there are deviations the agent quickly tries to bring the call back in line with the script. For example, an agent at an IT help desk first tries to identify the problem and then offers a solution. Similarly in a car rental process, the agent will first try to determine the type of car, the rental dates, and the location before offering a price and getting the personal details of the customer.

Figure 1:
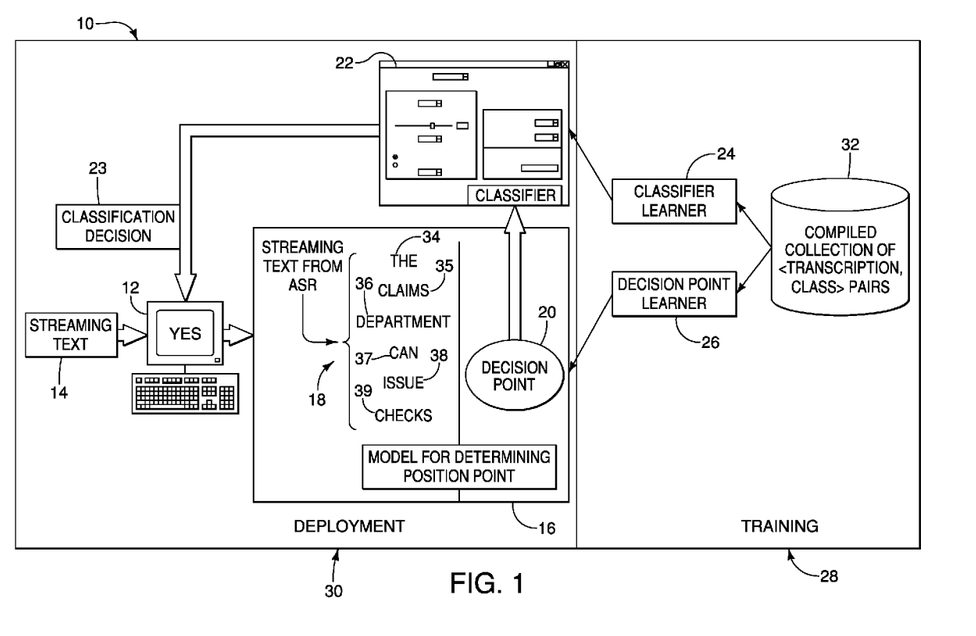
FIG. 1 is a functional block diagram showing a system in accordance with various embodiments.

Some embodiments provide classifiers, such as the one shown in FIG. 1, in contact centers for automatic call routing in response to online streaming text. However, there are multiple other applications that use streaming data such as real time agent assistance, instant call classification, identification of irate customers, identification of non-standard calls, agent performance monitoring etc. For example, if in a car rental process the customer starts out by saying that he would like to know the rates the agent is prompted to proceed in a certain way and when a customer starts out by saying that she would like to make a booking the agent is prompted to proceed in another way. Techniques to classify such text become important.

Various embodiments provide systems and methods using classifiers specifically designed for streaming text.

Typically classifiers are built for complete documents. During training of the classifier, representative documents for each class are selected and the probability distribution of features among the classes learnt. During testing, for a given document, its class is determined based on the distribution of the features within it. However, for a streaming document there are many issues:

1. For a classifier that has been trained on streaming text taken up to time t, how will the classifier perform on a text stream taken to time t-k?
2. Given a classifier and streaming text, when should the classifier make its final decision?
3. For non-stationary data should different classifiers be learnt for different portions of the streaming text?

In some embodiments, a classifier is used to determine the type of customer start in a contact center interaction. While this may seem like a decision that the agent can easily make, it should be remembered that during the call there can be multiple such decisions that need to be made. Thus, some embodiments provide classifiers that make these decisions and prompt a human agent.

A problem with classifying streaming texts is that by virtue of the conversational nature of the data, non-stationary behavior is exhibited within document rather than from one document to another. A process which is not stationary is a non-stationary process. A process is said to be stationary if its probability distribution does not change with time. Hence a non-stationary process has a probability distribution that changes with time.

The features appearing in one segment of the document might be different from the features appearing in other segments. Therefore, a typical classifier that works well on whole documents would not perform well on streaming text.

For scripted customer agent interactions one of the challenges is to quickly identify a particular conversational segment and classify that segment. For example, for a car rental application, a particular segment to be identified might be the "opening," which needs to be classified as good start or bad start. Similarly, in a help desk application, a segment to be identified is the segment in which customer is sharing a problem with an agent. This segment needs to be classified as soon as possible. The boundaries of these segments may be fuzzy. Thus, various embodiments provide real time call analysis comprising determining these boundaries quickly and effectively and making a classification decision.

These conversational boundaries can vary from call to call and are not available at the time that a classifier is trained. However, class labels for these particular segments are available at the call level at training time. These labels are usually generated by contact center agents as a post operational quality check exercise. These labels are used for determining an appropriate decision point for applying a classifier, in some embodiments.

In some embodiments, an entropy-based approach is used to decide the call segment boundary at which to perform classification. In some embodiments, the identified boundaries are used as a feedback loop to retrain the classifier on partial call segments so as to improve the accuracy of the classifier.

Classifying streaming text is different from building classifiers for call classification based on transcriptions of the complete calls or from routing customer calls based on a customer response to an open ended system prompt. In call classification the whole call (document) is collected before a decision is made. In call routing, the whole customer utterance (sentence) is collected before the classifier makes a decision. Manually classified past utterances are used to train the classifier and the new calls are classified/routed based on this classifier.

In the embodiment shown in FIG. 1, a system 10 includes a computer 12. The system 10 receives streaming text from any source 14 of streaming text. A source 14 may be, for example, a sound card (e.g., including a speech-to-text generator), a telephony card, a chat client, or any other appropriate source that may be external or internal of the computer 12. In some embodiments, the source 14 includes an automatic speech recognition system and converts voice to text. A model 16 is employed to determine when sufficient streaming text 18 has been received to make a classification decision. That determination, of whether sufficient streaming text 18 has been received, is made at a decision point 20. An example of a classification decision is whether the customer on the line is a candidate for discount offerings. A large variety of classification examples are provided in this document and in the references described above. The system 10 further includes a classifier 22. At the decision point 20, the classifier 22 is triggered to make a classification decision 23. Classifiers described herein may be binary or may be multi-class. In some embodiments, the classification decision 23 is displayed to a human agent or operator to aid the human operator. In other embodiments, the classification decision 23 results in some automated process, such as a call transfer or automated menu selection, or information is fetched from a database and presented to the human agent. In some embodiments, the classifier 22 is included in the computer 12.

In order to train the classifier 22, a classifier learner 24 and decision point learner 26 are trained in a training phase 28, prior to deployment 30, using a compiled collection 32 of transcription, class pairs. A variety of models 16 have been considered by the inventors, as will be described below.

In some embodiments, conversations of contact center agents are passed in real time through an automatic speech recognition system or speech-to-text generator to define the source 14 of streaming text. At the end of every speaker utterance the automatic speech recognition system outputs the word 34-39 uttered by the speaker. Hence, at a given time t the transcript of the conversation up to time t is available. When such text is passed to the classifier 22, the classifier potentially has a new decision at the end of every word. The classifier 22 gains more confidence about a decision made at a previous time t−1, has less confidence about the decision made at time t−1, or has a completely new decision.

Figure 2:
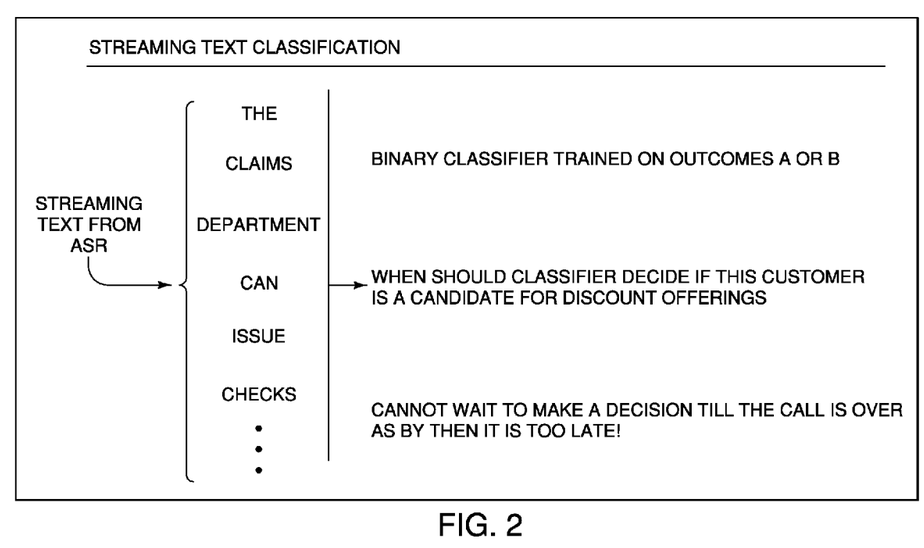
FIG. 2 is a time diagram illustrating text steaming over time and illustrating that a classifier can make a classification at any of various times.

As illustrated in FIG. 2, streaming text such as that generated in contact center conversations do not have a fixed duration. The contact centers often follow a script and, therefore, certain features are likely to appear at certain times but it is not certain when the features will appear. A classifier does not have the luxury of waiting until the conversation is over before making its decisions. The decision of the classifier depends on the time instance at which it looks at the stream.

If the process producing the text is stationary, then, at any arbitrary time, the probability of seeing a specific set of features is the same. However, for non-stationary text, this is not true. For non-stationary text streams, the time when the classifier makes a decision is important, and classification accuracy depends on it. To classify data, a classifier should be built on its own feature space.

In a scripted conversation, the order of appearance of features is predictable. With contact center data, a call typically follows a scripted call flow. Although the text stream is non-stationary across calls, it is predictable. For example, in typical calls, features relating to greeting are likely to occur at the beginning of the call, and features relating to types of payment are likely to appear towards the end of the call.

In some embodiments, entropy is used to select a decision point 20 for classification. In information theory, the information entropy or Shannon entropy of a random variable X is the measure of uncertainty associated with X. Information entropy or Shannon entropy is a measure of the uncertainty associated with a random variable. Shannon entropy quantifies the information contained in a piece of data: it is the minimum average message length, in bits, if using base-2 logarithms that must be sent to communicate the true value of the random variable to a recipient. Generally, it measures how many yes or no questions must be answered, on average, to communicate each new outcome of the random variable. The information entropy $H(X)$ of a discrete random variable X that can take values in the set $\{x_1, x_2, \ldots, x_n\}$ is defined to be:

$$H(X) = E(I(X)) = \sum_{i=1}^{n} p(x_i) \log_2\left(\frac{1}{p(x_i)}\right) = -\sum_{i=1}^{n} p(x_i) \log_2(p(x_i))$$

where I(X) is the self information of X which is itself a random variable, and where $p(x_i)$ is the probability mass function of X.

Let $S_x$ be the class predicted for an instance x by a probabilistic classifier such as logistic regression (see Landwehr, N., Hall, M., Eibe, F.: Logistic Model Trees, Proceedings of European Conference on Machine Learning, Cavtat-Dubrovnik, Croatia, Sep. 22-26 (2003), pp. 241-252, incorporated herein by reference). $S_x$ takes on a value from the set of class labels C. The classifier associates a distribution with $S_x$. Entropy of the class random variable $S_x$ is used, in some embodiments, to measure the uncertainty U(x) associated with the classification of x.

$$U(x) = \sum_{C_x \text{ in } C} p(C_x) \log_2(p(C_x))$$

where $p(C_x)$ is the posterior probability of class $C_x$ for the instance x as predicted by the probabilistic classifier. A low value of U(x) implies that the classifier is uncertain about the classification of instance x.

For example, if a logistic regression model outputs p(class1)=0.2, p(class2)=0.3 and p(class3)=0.5, then the entropy of the classification is −[0.2*log(0.2)+0.3*log(0.3)+0.5*log(0.5)]=1.029. More about how a logistic regression classifier works and how it is trained to compute probabilities can be found, for example, in A Tutorial On Logistic Regression by Ying So, SAS Institute Inc., Cary N.C., available at http://www.ats.ucla.edu/stat/SAS/library/logistic.pdf and incorporated herein by reference.

In some embodiments, this uncertainty measure is used for determining which text segment to choose from the test document to determine its class. In some embodiments, for simpler computability, the choice of text segments is restricted to multiples of units that are sentences. In some embodiments, the system 10 checks for uncertainty at the end of every turn of the conversation. The end of a turn is marked by change in the speaker. The information for when a turn ends is observable because each speaker's voice is available on a different channel. In some embodiments, the choice of segments is further restricted to those that start at the beginning of the conversation. The segment comprising the first k sentences from a conversation S is referred to as $s_k$.

For example, consider the following conversation from source 14,

S=
<text name="Agent">Welcome to xxx this is Bill how may i help you</text>
<text name="Customer">hi i am looking for a car in San Antonio</text>
<text name="Agent">un hmm on what date do you want to pick up the car sir</text>
<text name="Customer">On the 23rd of June</text>

In some embodiments, the following segments s1, s2, s3, and s4 are considered as candidate segments:

s1=
<text name="Agent">welcome to xxx this is Bill how may i help you</text> s2=
<text name="Agent">welcome to xxx this is Bill how may i help you</text>
<text name="Customer">hi i am looking for a car in San Antonio</text> s3=
<text name="Agent">welcome to xxx this is Bill how may i help you</text>
<text name="Customer">hi i am looking for a car in San Antonio</text>
<text name="Agent">un hmm on what date do you want to pick up the car sir</text>and s4=
<text name="Agent">welcome to xxx this is Bill how may i help you</text>
<text name="Customer">hi i am looking for a car in San Antonio</text>
<text name="Agent">un hmm on what date do you want to pick up the car sir</text>
<text name="Customer">on the 23rd of June</text>

Given a test conversation, S consisting of N sentences, the inventors considered two methods for determining its true class C(S) on online streaming text: GlobalEntropy and LocalEntropy.

GlobalEntropy (see Domingos, P., Hulten., G.: Mining High-Speed Data Streams, Proceedings of International Conference on Knowledge Discovery and Data Mining, (2000) pp. 71-80, incorporated herein by reference) is suitable when the entire conversation is made available before-hand, and the task is to determine segment that best determines the class label for the conversation. The best segment is determined by computing the uncertainty $U(S_i)$ of every segment $s_i$, where $1 \leq i \leq N$ and finding the segment that has the lowest uncertainty.

$C(S,\text{GlobalEntropy})=C(s_k)$ where $s_k=\text{argmins}_{i, 1 \leq i \leq N} U(s_i)$ where C(S,GlobalEntropy) is the class determined for the test instance S using the Global Entropy method and $C(s_k)$ is the class determined for segment $s_k$ using the probabilistic classifier that is being used. Further, the quantity Global Test Ratio is defined for a phone call as the ratio of k/N.

The inventors have determined that a LocalEntropy method (see Glass, J. R., Hazen, T. J., Hetherington, I. L.: Real-Time Telephone-Based Speech Recognition in the Jupiter Domain, Proceedings of IEEE International Conference on Acoustics, Speech, and Signal Processing, Phoenix, Ariz., Mar. 15-19 (1999), pp. 61-64, incorporated herein by reference) is more suitable when the conversation is made available in a streaming manner and the task is to classify the conversation as quickly as possible. This method computes the uncertainty for the segment that has been seen so far and as soon as the uncertainty increases, it determines the class label based on the segment till the previous time instance.

$C(S,\text{LocalEntropy})=C(s_k)$ where $U(s_k)<U(s_k+1)$ where C(S,LocalEntropy) is the class determined for the test instance S using the LocalEntropy method. Further, a quantity Local Test Ratio is defined for a call as the ratio of k/N.

In some embodiments, with streaming text, the classifier incrementally updates its decisions. At every segment, the classifier has a decision, p(Cx), and an associated entropy value, U(x). At some point into the stream the classifier has to decide on the "true" class. The relative entropy over the stream determines the point at which to make this decision. While, in the illustrated embodiment, segment level streams have been used, in various embodiments, word streams are used.

It is possible that the LocalEntropy-based segment detection of some embodiments may reach a local minima. Whether a point is a local minima is determined, in some embodiments, by checking whether the LocalEntropy again dips after x words. Of course checking for local minima in this way introduces some latency based on the size of x.

In some embodiments, a classifier is built on complete data and then the entropy-based approach is used to make decisions on partial documents. Such approaches were described above. However, the inventors have considered whether a classifier based on partial data would perform better.

In embodiments where the source of streaming text is a phone call, for example, depending on the class labels, different portions of the call may be important. To classify whether the human agent opens the call in a proper way, a classifier built on just the first portion of the call is needed. However, for separating calls where, for example, credit card details are asked versus those where the customer agrees to pay on delivery, the middle segment of the call may be important. So the same call may need to be classified into these different classes, where different classifiers can come into play on different segments of the call. In order to classify the type of agent opening, a classifier is built on just the beginning of the call rather than the whole document, in some embodiments, so the classifier can make a decision at the end of the opening utterance by the human agent.

The inventors have noted that in a scripted conversation features appear sequentially, and call after call they follow a particular sequence. Learning a classifier on streaming text would mean that the classifier is updated with each new feature that appears.

The inventors hypothesized that a classifier built using the whole document reaches a "true" decision after seeing just a fraction of the call. If this is true then the features up to that point are enough for reaching this decision.

Given a collection of training conversations, T consisting of M conversations, the inventors considered a method for determining the segment sk that should be used for training the classifier.

A cut off segment, TrainingCutOffPoint is determined by computing the Average Global Test Ratio, G, for the collection T of training conversations. Based on this ratio, $s_k = G \times N$ is selected from each call to train the classifier.

After the classifier has been trained, to use it on streaming text, the procedure of incremental classification described above is used, in the preferred embodiment. The classifier incrementally updates its decisions. At every segment, the classifier has a decision, p(Cx), and an associated entropy value, U(x). At some point into the stream the classifier has to decide on the "true" class. The relative entropy over the stream determines the point at which to make this decision.

The inventors obtained automatic transcriptions of contact center dialogs from a car rental process using an Automatic Speech Recognition (ASR) system for an experiment. Other sources of streaming text could have been selected for the experiment. The transcription output comprised information about the recognized words along with their durations, i.e., beginning and ending times of the words. Further, speaker turns are marked, so the agent and customer portions of speech are demarcated. Speaker turns can be determined based on a change in the source of the audio, because the source of the audio is different for the agent versus the caller. 527 calls were used for experiments. These calls were labeled according to two criteria. In one they were labeled based on the reason for non-booking by a customer. Non-booking here relates to a call where the customer didn't rent a car. Labels such as shopping around, high rates, unavailability, etc. were assigned by quality control personnel of the contact center. In total there were 9 such labels in the experiment. The second criterion for labeling was binary labeling based on the intention of the customer at the start of the call to make a booking or to find out the rates.

The inventors conducted classification experiments for the tasks of customer intent classification and reason for non-booking. They trained a logistic regression classifier on complete call transcripts of all of the 527 calls with a 90:10 split for training and testing for each task. They averaged the results over 5 such random splits. During the testing phase instead of classifying the complete call (or conversation), they classified the call incrementally where each unit of increment was a sentence as described above. For each such increment, entropy was computed.

Figure 3:
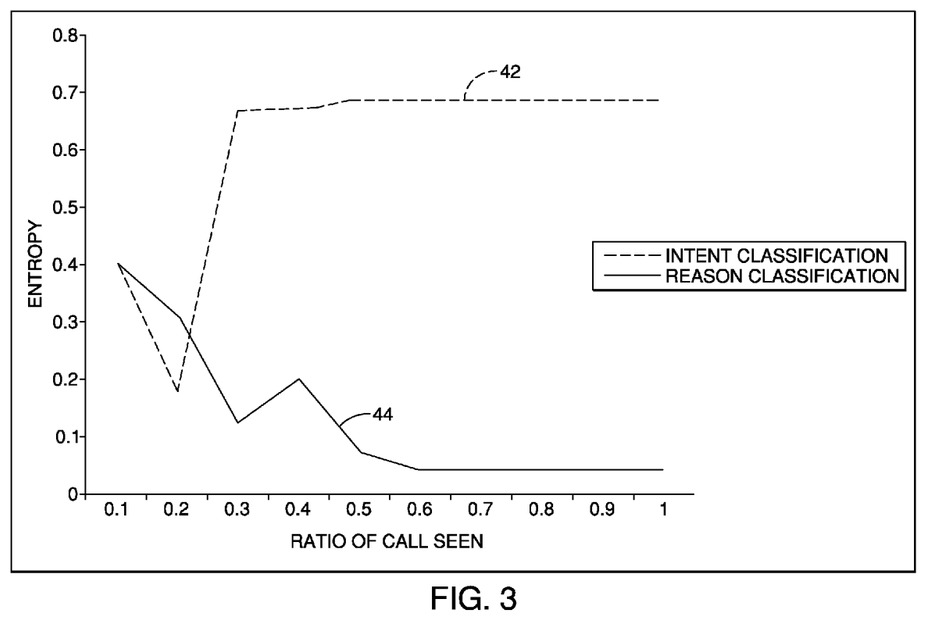
FIG. 3 is a graph of entropy versus different call increments.

FIG. 3 shows the variation in entropy as the call progresses for two calls selected at random from the two tasks. For intent classification in this particular call, illustrated by plot 42, it is observed that the LocalEntropy and the GlobalEntropy coincide. Further, the entropy increases as the call progresses. From this, the inventors concluded that, for intent classification, the beginning of the call is important. This seems reasonable since a human labeler typically looks at the first few customer utterances to decide the customer intent label.

For reason classification, illustrated by plot 44, the LocalEntropy and the GlobalEntropy do not coincide. However, the entropy flattens out in the middle of the call. For reason classification, the entropy trend resembles a human labeling process wherein the human typically scans the call from the beginning but makes a decision before completing the whole call.

Figure 4:
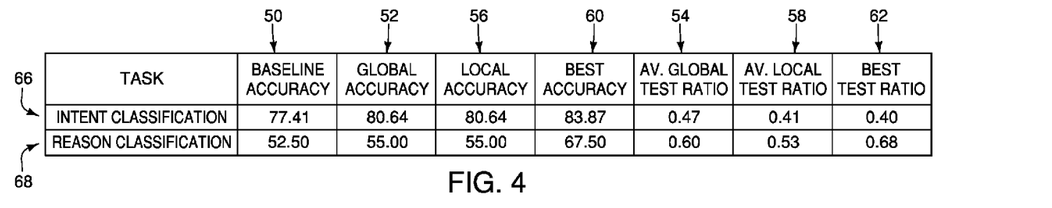
FIG. 4 is a table that illustrates classification accuracy for two tasks.

FIG. 4 shows the classification accuracy for the intent classification task and reason classification task averaged over all the calls. Data for the intent classification task is shown in a first row 66 and data for the reason classification task is shown in the second row 68. Incremental classification is performed and four different accuracy results are presented. Baseline accuracy 50 represents the case when the testing is done on the whole call. Global accuracy 52 represents the accuracy when the segment is selected based on GlobalEntropy.

The average global test ratio 54 represents the fraction of the call where the global minima of the entropy lies on an average for the whole set. For example, for a single stream with N segments, the entropy of each of the N segments is determined. Out of these N entropy measurements assume that the entropy is minimum at the kth segment (Global entropy). Then the global test ratio is k/N. When this is averaged over many streams for the same classification task (e.g., reason classification) average global test ratio is obtained. For example, if there are five streams with N=20, 30, 50, 40, 60 respectively and the corresponding values of k=8, 8, 14, 12, 18, respectively then the global test ratios are 0.4, 0.267, 0.28, 0.3, 0.3 and the average global test ratio is 0.31.

Local accuracy 56 is what is actually used in classification of online streaming text. It is the accuracy when the segment is selected based on LocalEntropy. The average local test ratio 58 is the fraction of the call one needs to see before making a classification decision. The best accuracy 60 is the maximum classification accuracy for different segment lengths. The best accuracy 60 is arrived at by computing the classification scores for different segment lengths and selecting that segment which gives the highest accuracy over the whole collection. The best accuracy 60 is the upper bound that can be obtained for the given task using a given classifier. The best test ratio 62 is the fraction at which this highest accuracy is obtained.

For the intent classification task, shown in row 66, the global test ratio 54 and the local test ratio 58 are quite close, which means that often the global maxima and the local maxima coincide. As a result, the global accuracy and the local accuracy are the same.

This is also true for the reason classification task, shown in row 68. The best accuracy 60 is higher than both these accuracies but the best test ratio 62 is not very far from the local test ratio 58.

The best accuracy 60 is higher than the baseline accuracy 50. This suggests that the ASR data stream is indeed non-stationary in nature and a more confident decision can be made by looking at a partial call rather than the complete call. The inventors have determined that the entropy-based method serves as a good heuristic for approximating the decision boundary. The results from the experiment support this, as the local accuracy 56 is close to the best accuracy 60.

The intent classification (row 66) and reason classification (row 68) are two example classification tasks to demonstrate the usage and applicability of the method. The method can be applied to other classifications tasks as well. The conclusion about the fraction of the call to be seen before making a decision is based on the change in local entropy measurement. Global entropy is only used as a benchmark to measure the performance of local entropy.

Figure 5:
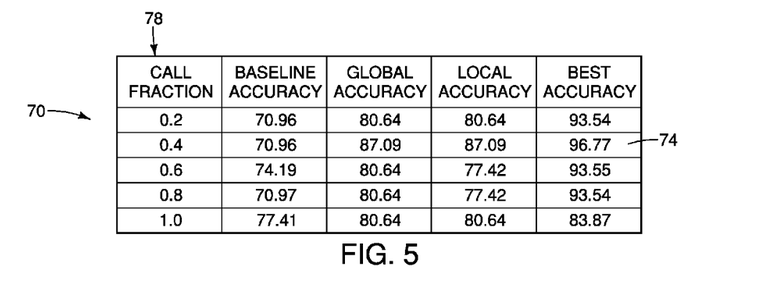
FIG. 5 is a table that illustrates different accuracies versus various different fractions of a call for classifiers that have been trained on the different fractions of the call, for intent classification.
Figure 6:
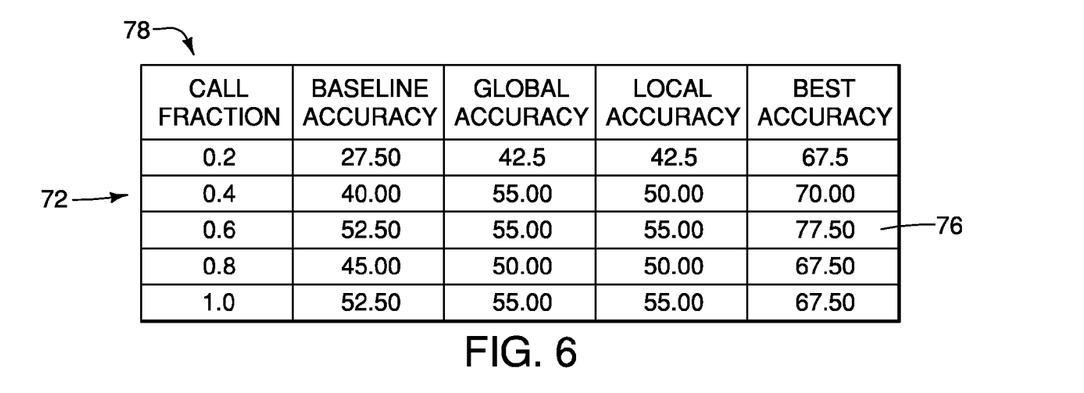
FIG. 6 is a table that illustrates different accuracies versus various different fractions of a call for classifiers that have been trained on the different fractions of the call, for reason classification.

FIGS. 5 and 6 show the different accuracies for classifiers that have been trained on fractions of the call for intent classification 70 and reason classification 72, respectively. 0.2 under the heading "call fraction" means 20% of the conversation, 0.4 means 40%, etc. In both tables it can be seen that the best accuracy peaks (see 74 and 76) when the classifier is trained on a fraction of the call. This fraction is the same as the test ratios reported in FIG. 4. This shows that the global test ratio 54 is a good measure for selecting the training cut off point. The global test ratio 54 is available at a call level whereas the best test ratio 62 is available at a collection level.

Therefore, in some embodiments, the training cut off point TrainingCutOffPoint is set at a call level if the global test ratio is used. The classifier 22 (see FIG. 1) can be retrained based on training cut off point TrainingCutOffPoint to improve the classification accuracy.

In view of the foregoing, the inventors have shown that automatic speech recognizer data streams are non-stationary in nature for many classification tasks. Therefore, an incremental classification approach is believed to be better suited than classification based on the complete call, and the incremental classification approach is used in preferred embodiments. For applications which require decisions in real time, classification is performed on call segments, rather than the complete call, in some embodiments. The inventors have shown that an entropy-based measure can be used successfully to find the decision point with good accuracy. Therefore, in some embodiments, an entropy-based measure is used to find a decision point. Further, the inventors have shown that the classification accuracy can be improved by training the classifier on the relevant fraction of the call or conversation rather than the whole call. Therefore, in some embodiments, the classifier is trained on relevant fractions of calls or conversations rather than on a whole call. In some embodiments, the classification window extends from the beginning of a call or conversation to the point where a decision is made.

Thus, some embodiments provide a system and method for selecting a decision point during classification and then, based on this classification point, selecting training data for training a classifier.

The classifier requires training data for learning and then labels a previously unseen example based on learned probability distribution. However, because these are non-stationary streams, at different points the stream segment carries different information. For example, the beginning of a conversational stream may carry information related to the intent of the customer whereas, later, the stream carries information related to the customer's reason for being interested in a particular product or service. Since training data is required, labeled stream data are needed. However, in some embodiments, this labeling is performed at stream level and need not be at a segment level with decision points as to where the information contained in the stream changes. Therefore, a single call can be labeled with different labels for different tasks without identifying which particular portion of the call the label is referring to.

The accuracy of the classifier depends on the data on which it is trained. In order to get better accuracy, it is beneficial to train the classifier only on that portion of the call for which a particular label is applicable. Either these partial call segments can be provided manually or a feedback loop can be used for automatic feature engineering. If provided manually, the classifier is trained on segments instead of complete calls. For automatic engineering, the classifier is trained first on complete calls. Then, based on this classifier, a decision point is determined (the local test ratio or global test ratio). This decision point gives a partial call and the classifier is retrained in this embodiment, using the partial call instead of the complete call. This process can be repeated iteratively.

While FIG. 1 shows only one classifier, in alternative embodiments, many such classifiers can be built for a single conversation, each with a different decision point.

Various aspects of the invention can take the form of an entirely hardware embodiment, an entirely software embodiment or an embodiment containing both hardware and software elements. In some embodiments, the invention is implemented in software, which includes but is not limited to firmware, resident software, microcode, etc.

Furthermore, aspects of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem cards, telephony cards, and Ethernet cards are just a few of the currently available types of network adapters.

Figure 7:
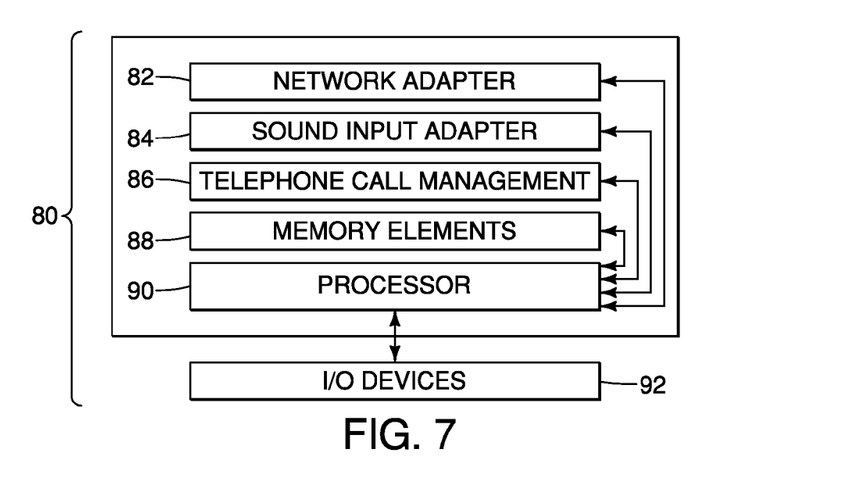
FIG. 7 is a hardware block diagram of a system that can perform the functions of FIG. 1.

More particularly, in some embodiments, the hardware used to define the functional blocks of FIG. 1 includes (see FIG. 7) a computer 80 with a network adapter 82 such as a modem or network card, sound/microphone input adapter or card 84, telephone call management system or telephony adapter or card 86, memory elements 88, and a processor 90. The hardware used to define the functional blocks of FIG. 1 also includes, in some embodiments, I/O devices 92 comprising, for example, a monitor and keyboard. The computer 80, in operation, runs speech recognition software. The speech recognition software provides the start and end timings of each segment.

In compliance with the patent statutes, fairly specific embodiments, including preferred embodiments, have been described. It is to be understood, however, that the patent protection sought is not to be limited to the specific embodiments shown and described. The protection sought is to be limited only by the following claims, which are to be afforded full scope, and to be appropriately interpreted in accordance with the doctrine of equivalents. It should be readily apparent that the improvements claimed herein provide more than predictable use of prior art elements according to their established functions.

The invention claimed is:

1. A computer-implemented method for determining a decision point in real-time for a data stream from a conversation, the method comprising:
   receiving, by a computing device, streaming conversational data; and
   determining, by said computing device, when to classify the streaming conversational data into one of thematic categories and labels from a predefined set, using
      a measure of certainty, by performing certainty calculations at a plurality of time instances during the conversation and
      by selecting a decision point in response to the certainty calculations, the decision point being based on accumulated conversational data available at different ones of the plurality of time instances.

2. The method in accordance with claim 1, wherein the certainty calculations comprise entropy calculations.

3. The method in accordance with claim 1, wherein multiple decisions are made at one or more of the time instances before the completion of the conversation, and wherein respective decisions have respective different decision points which can be different from one another and which are based on respective certainty calculations.

4. The method in accordance with claim 2, and further comprising training, by said computing device, a classifier and engineering features based on labeled information.

5. The method in accordance with claim 3, wherein the labeled information comprises outcomes of previous conversations which need not have the decision points.

6. The method in accordance with claim 3, wherein a single conversation is labeled with a plurality of different labels without specifying portions of the conversation as being associated with any of the labels.

7. The method in accordance with claim 1, and further comprising training, by said computing device, a classifier using a portion of a conversation.

8. The method in accordance with claim 1, and further comprising training, by said computing device, a classifier using a portion of a conversation chosen in response to the selected decision point.

9. The method in accordance with claim 1, wherein the conversation is a call center conversation, and wherein the method further comprises outputting, by said computing device, information to assist a human in decision-making at the selected decision point.

10. The method in accordance with claim 1, wherein the conversation is a call center conversation, and wherein the method further comprises taking automated action, by said computing device, at the selected decision point.

11. The method in accordance with claim 1, wherein the conversation is a call center conversation, wherein the conversation is scripted and has a flow structure, and wherein knowledge of the script is used in selecting a decision point.

12. A system comprising:
   a computer including a network adapter configured to receive connections from external computers, the computer being configured
   to receive streaming text from a conversation and
   to determine when to classify the streaming text into one of thematic categories and labels from a predefined set, using
      a measure of certainty, by performing entropy calculations at a plurality of time instances during receipt of the streaming text, and
      by selecting a decision point in response to the entropy calculations, the decision point being based on text accumulated at the respective time instances, and
      to perform a classification operation at the decision point, prior to completion of the conversation.

13. The system in accordance with claim 12, and configured to make multiple decisions at one or more of the time instances before the completion of the conversation, and wherein respective decisions have respective different decision points which can be different from one another and which are based on respective entropy calculations.

14. The system in accordance with claim 12, and further comprising a classifier configured to be trained based on labeled information that comprises outcomes of previous conversations.

15. The system in accordance with claim 12, and comprising an output device, wherein the system is configured to output classification information, using the output device, to assist a human at the selected decision point.

16. A non-transitory computer program medium having a computer readable program, wherein the computer readable program when executed on a computer causes the computer to:
   determine when to classify streaming conversational data into one of thematic categories and labels from a predefined set, using a measure of certainty, by performing certainty calculations at a plurality of time instances during the conversation and by selecting a decision point in response to the certainty calculations, the decision point being based on accumulated conversational data available at different ones of the plurality of time instances.

17. The non-transitory computer program medium in accordance with claim 16, wherein the certainty calculations comprise entropy calculations.

18. The non-transitory computer program medium in accordance with claim 16, wherein multiple decisions are made at one or more of the time instances before the completion of the conversation, and wherein respective decisions have respective different decision points which can be different from one another and which are based on respective certainty calculations.

* * * * *